United States Patent
Stark et al.

(10) Patent No.: US 7,351,765 B2
(45) Date of Patent: Apr. 1, 2008

(54) METHOD FOR PRODUCING POLYVINYLACETALS

(75) Inventors: Kurt Stark, Burgkirchen (DE); Peter Tschirner, Emmerting (DE); Karl-Heinz Eichel, Burghausen (DE); Georg Friedl, Burghausen (DE); Franz Eichberger, Handenberg (AT)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 164 days.

(21) Appl. No.: 10/513,691

(22) PCT Filed: Sep. 4, 2003

(86) PCT No.: PCT/EP03/09821

§ 371 (c)(1),
(2), (4) Date: Nov. 8, 2004

(87) PCT Pub. No.: WO2004/026917

PCT Pub. Date: Apr. 1, 2004

(65) Prior Publication Data

US 2005/0171280 A1    Aug. 4, 2005

(30) Foreign Application Priority Data

Sep. 12, 2002 (DE) .............................. 102 42 417

(51) Int. Cl.
*C08F 8/00* (2006.01)

(52) U.S. Cl. ............................ 525/61; 525/55; 428/294
(58) Field of Classification Search .................. 525/55, 525/61, 51; 428/494
See application file for complete search history.

(56) References Cited

U.S. PATENT DOCUMENTS

| 3,278,505 | A | * | 10/1966 | Kominami | ................... 525/62 |
| 3,544,538 | A | | 12/1970 | Masuda et al. | |
| 4,205,146 | A | | 5/1980 | Hermann et al. | |
| 6,211,289 | B1 | * | 4/2001 | Tschirner et al. | ............. 525/61 |
| 2006/0052530 | A1 | * | 3/2006 | Bacher et al. | ................ 525/56 |

FOREIGN PATENT DOCUMENTS

| DE | 1 495 548 | 2/1969 |
| DE | 196 41 064 | 4/1998 |
| EP | 0 000 699 | 2/1979 |
| EP | 0 513 857 | 11/1992 |
| EP | 1 055 686 | 11/2000 |

OTHER PUBLICATIONS

Derwent Abstract corresponding to EP-A 1 055 686 [AN 2000-482991].

* cited by examiner

*Primary Examiner*—Ling-Sui Choi
*Assistant Examiner*—M. Bernshteyn
(74) *Attorney, Agent, or Firm*—Brooks Kushman P.C.

(57) ABSTRACT

Polyvinyl acetals are obtained in a cost-effective and environmentally advantageous manner by employing as at least a portion of the aqueous acetalization medium, the mother liquor from a previous acetalization reaction.

10 Claims, No Drawings

METHOD FOR PRODUCING POLYVINYLACETALS

BACKGROUND OF THE INVENTION

1. Field of the Invention

The invention relates to a process for preparing polyvinyl acetals, where the mother liquor from a preceding batch is used in the form of the aqueous medium in which the acetalization takes place.

2. Description of the Related Art

The preparation of polyvinyl acetals, which are obtained from the corresponding polyvinyl alcohols by polymer-analogous reaction with the appropriate aldehydes, was disclosed as early as 1924, and since then a wide variety of aldehydes have been used for preparing the corresponding polyvinyl acetals. Polyvinyl acetals are prepared in a 3-stage process (polyvinyl acetate→polyvinyl alcohol→polyvinyl acetal), and the resultant products contain vinyl alcohol units and vinyl acetate units as well as vinyl acetal groups. Polyvinyl formal, polyvinyl acetacetal, and polyvinyl butyral (PVB) have achieved particular commercial importance. The term "modified polyvinyl acetals" hereinafter means polyvinyl acetals which contain other monomer units as well as the three previously mentioned units vinyl acetate, vinyl alcohol, and vinyl acetal.

The largest application sector for polyvinyl acetals is the production of safety glass in automotive construction and for architectural uses, plasticized polyvinyl butyral films being used as an intermediate layer in glazing units. Another application sector for polyvinyl butyrals is use in corrosion-protection coatings, found in EP-A 1055686, for example. Polyvinyl butyrals are also used as binders in coatings, and specifically in printing inks, one of the reasons here being their good pigment binding power. Examples of these are the modified polyvinyl butyrals with low solution viscosity from DE-A 19641064, obtained via acetalization of a copolymer having vinyl alcohol units and 1-alkylvinyl alcohol units.

In the abovementioned three-stage process, polyvinyl acetals are prepared by preparing a solution of polyvinyl alcohol in water, treating this with acid, and precipitating the polyvinyl acetal from this solution (mother liquor) via addition of aldehydes. The product is separated from the mother liquor, where appropriate subjected to a further treatment, washed, and dried. To increase the degree of acetalization, the process of EP-B 513857 proposes carrying out the acetalization with use of a temperature gradient, i.e. increasing the temperature during the precipitation.

SUMMARY OF THE INVENTION

An object of the present invention was to provide a less expensive and more environmentally compatible process for preparing polyvinyl acetals. Surprisingly, it has been found that the quality of the mother liquor is so good, and remains so good even on repeated reuse, that it can be reused for preparing further polyvinyl acetals.

Surprisingly, it has been found that the quality of the mother liquor is so good, and remains so good even on repeated reuse, that it can be reused for preparing further polyvinyl acetals.

DETAILED DESCRIPTION OF THE PREFERRED EMBODIMENTS

The invention provides a process for preparing polyvinyl acetals obtainable by means of hydrolysis of a vinyl ester polymer and then acetalization of the resultant polyvinyl alcohol with one or more aldehydes from the group consisting of aliphatic and aromatic aldehydes having 1 to 15 carbon atoms, where a) the polyvinyl alcohol forms an initial charge in an aqueous medium,
b) where appropriate, acid is added to adjust to a pH of <1,
c) the acetalization is initiated via addition of the aldehyde component, and
d) the precipitating polyvinyl acetal is separated via filtration from the filtrate, which comprises using, at 10 to 100% by weight of the aqueous medium, the filtrate of a preceding batch, and, where appropriate, in a further batch, reusing the filtrate produced in d).

Suitable vinyl ester polymers are those based on one or more vinyl esters of unbranched or branched carboxylic acids having 1 to 15 carbon atoms. Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having 5 to 11 carbon atoms, for example, VeoVa9$^R$ or VeoVa10$^R$ (trade names of Resolution Performance Products). Vinyl acetate is particularly preferred.

Where appropriate, the vinyl ester polymers may also contain monomer units which derive from one or more monomers from the group consisting of unsaturated mono- or dicarboxylic acids and their esters of alcohols having 1 to 15 carbon atoms, olefins, dienes, vinylaromatics, and vinyl halides. Suitable monomers from the group of the unsaturated mono- or dicarboxylic acids are acrylic acid, methacrylic acid, fumaric acid, and maleic acid. Suitable monomers from the group of the esters of the unsaturated mono- or dicarboxylic acids are esters of unbranched or branched alcohols having 1 to 15 carbon atoms. Preference is given to methacrylic or acrylic esters, for example methyl acrylate, methyl methacrylate, ethyl acrylate, ethyl methacrylate, propyl acrylate, propyl methacrylate, n-, iso-, and tert-butyl acrylate, n-, iso-, and tert-butyl methacrylate, 2-ethylhexyl acrylate, norbornyl acrylate. Particular preference is given to methyl acrylate, methyl methacrylate, n-, iso-, and tert-butyl acrylate, 2-ethylhexyl acrylate, and norbornyl acrylate. Suitable dienes are 1,3-butadiene and isoprene. Examples of polymerizable olefins are ethene and propene. Vinylaromatics which may be copolymerized are styrene and vinyltoluene. From the group of the vinyl halides those usually used are vinyl chloride, vinylidene chloride, or vinyl fluoride, preferably vinyl chloride. The proportion of these comonomers is preferably selected in such a way that the proportion of vinyl ester monomer is >50 mol % in the vinyl ester copolymer.

Where appropriate, the comonomers may also contain other comonomers in a proportion which is preferably 0.2 to 20% by weight, based on the total weight of the comonomers. Examples are ethylenically unsaturated carboxamides and ethylenically unsaturated carbonitriles, preferably N-vinylformamide, acrylamide, and acrylonitrile; ethylenically unsaturated sulfonic acids or their salts, preferably vinylsulfonic acid, and 2-acrylamido-2-methylpropanesulfonic acid. Other examples are pre-crosslinking comonomers, such as polyethylenically unsaturated comonomers, e.g. divinyl adipate, diallyl maleate, allyl methacrylate, butanediol diacrylate, or triallyl cyanurate, or post-crosslinking comonomers, such as acrylamidoglycolic acid (AGA), methyl methylacrylamidoglycolate (MAGME), N-methylolacrylamide (NMA), N-methylolmethacrylamide, allyl N-methylolcarbamate, alkyl ethers, such as the isobutoxyether, or esters of N-methylolacrylamide, of N-methylolmethacrylamide, or of allyl N-methylolcarbamate.

Particular preference is given to polyvinyl acetate, vinyl acetate-1-methylvinyl acetate copolymers, and vinyl acetate-(meth)acrylic acid copolymers.

The polymerization to prepare suitable polyvinyl esters takes place in a known manner, preferably via bulk polymerization, suspension polymerization, or polymerization in organic solvents, particularly preferably in alcoholic solution. Examples of suitable solvents and regulators are methanol, ethanol, propanol, isopropanol, and acetaldehyde. The polymerization is carried out at reflux at a temperature of 55 to 100° C., and is initiated by a free-radical route via addition of familiar initiators. Examples of familiar initiators are percarbonates, such as cyclohexyl peroxydicarbonate, or peresters, such as tert-butyl perneodecanoate or tert-butyl perpivalate. The molecular weight may be adjusted in a known manner via addition of regulators, via the solvent content, via variation of the initiator concentration, or via variation of the temperature. Once the polymerization has concluded, the solvent is distilled off, as are, where appropriate, excess monomer and the regulator.

The hydrolysis of the vinyl ester polymers to give polyvinyl alcohols takes place in a manner known per se, e.g. by the belt process or kneader process, in an alkaline or acidic medium, with addition of acid or base. The solid resin is preferably taken up in alcohol, such as methanol, adjusting to a solids content of 15 to 70% by weight. The hydrolysis is preferably carried out in a basic medium, for example via addition of NaOH, KOH, or $NaOCH_3$. The amount generally used of base is 1 to 5 mol % per mole of ester units. The hydrolysis is carried out at temperatures of 30 to 70° C. Once the hydrolysis has concluded, the solvent is distilled off, and the polyvinyl alcohol is obtained as powder. However, the polyvinyl alcohol may also be obtained in the form of an aqueous solution via progressive addition of water while the solvent is distilled off.

The partially or completely hydrolyzed vinyl ester polymers preferably have a degree of hydrolysis of 50 to 100 mol %, particularly preferably 70 to 99 mol %, most preferably $\geq 96$ mol %. Polymers described here as completely hydrolyzed are those whose degree of hydrolysis is $\geq 96$ mol %. Partially hydrolyzed polyvinyl alcohols are those whose degree of hydrolysis is $\geq 50$ mol % and <96 mol %.

For the acetalization, the partially or fully hydrolyzed polyvinyl acetates are taken up in an aqueous medium, the aqueous medium used comprising 10 to 100% by weight of the filtrate of a preceding batch. The solids content of the aqueous solution is usually adjusted to 5-30% by weight. The polyvinyl alcohol preferably forms an initial charge in the form of an aqueous solution with a concentration of 10 to 50% by weight, and the desired solids content is established via addition of the filtrate (mother liquor) which derives from a preceding batch and comprises water, acid, and a very small concentration of residual aldehydes. The mother liquor may be subjected to prior filtration in order to minimize the solids content of preceding product remaining therein. Where appropriate, the solids content for the precipitation may also be further adjusted to the desired value via addition of water.

The acetalization takes place in the presence of acid (acidic catalysts), for example hydrochloric acid, sulfuric acid, nitric acid, or phosphoric acid, at a pH <1. If the pH obtained using the mother liquor is still too high, further acid is added. The pH of the solution is preferably adjusted to a value <1 via addition of 20% strength hydrochloric acid.

After addition of the acid, the solution is cooled, preferably to −10 to +30° C. The rule here is: the lower the molecular weight of the polyvinyl alcohol used, the lower the selected precipitation temperature. Once the precipitation temperature has been established, the precipitation of the polyvinyl acetal is initiated via addition of the aldehyde component.

Preferred aldehydes from the group of the aliphatic aldehydes having 1 to 15 carbon atoms are formaldehyde, acetaldehyde, propionaldehyde, and most preferably butyraldehyde, or a mixture of butyraldehyde and acetaldehyde. Examples of aromatic aldehydes which may be used are benzaldehyde or its derivatives. The amount of aldehyde added here depends on the desired degree of acetalization. Because the acetalization proceeds with almost complete conversion, the amount to be added can be determined via simple stoichiometric calculation. Once the addition of the aldehyde has concluded, the acetalization is completed via heating of the batch to 20-60° C. and stirring for some hours, preferably 1 to 6 hours, and the precipitating polyvinyl acetal is isolated via filtration from the filtrate. The pulverulent reaction product is isolated after a washing step and drying step.

The mother liquor (filtrate) from which the batch has been precipitated is preferably stored and used for a subsequent precipitation. To stabilize the product, alkalis may also be added. During precipitation and further treatment, use may be made of emulsifiers in order to stabilize the aqueous suspension of the polyvinyl acetal.

In order to stabilize the aqueous suspension of the polyvinyl acetal, use may be made of anionic, zwitterionic, cationic, or non-ionic emulsifiers, or else protective colloids. It is preferable to use zwitterionic or anionic emulsifiers, where appropriate also in mixtures. Preferred non-ionic emulsifiers used are condensation products of ethylene oxide (EO) or propylene oxide (PO) with linear or branched alcohols having 8 to 18 carbon atoms, or with alkylphenols, or with linear or branched carboxylic acids having 8 to 18 carbon atoms, or else block copolymers of ethylene oxide and propylene oxide. Examples of suitable anionic emulsifiers are alkyl sulfates, alkylsulfonates, alkyl aryl sulfates, and sulfates or phosphates of condensation products of ethylene oxide with linear or branched alkyl alcohols with 2 to 25 EO units or with alkylphenols, and mono- or diesters of sulfosuccinic acid. Examples of suitable zwitterionic emulsifiers are alkyldimethylamine oxides, the alkyl chain having 6 to 16 carbon atoms. Examples of cationic emulsifiers which may be used are tetraalkylammonium halides, such as $C_6$-$C_6$-alkyltrimethylammonium bromide. It is also possible to use trialkylamines having one relatively long ($\geq 5$ carbon atoms) and two relatively short hydrocarbon radicals (<5 carbon atoms), these being present in protonated form during the course of the acetalization, which proceeds under strongly acidic conditions, and being capable of acting as emulsifier. The amount of emulsifier is 0.01 to 20% by weight, based on the total weight of the polyvinyl acetal in the mother liquor. Preference is given to amounts of 0.01 to 2% by weight of emulsifier, and a particularly preferred amount of emulsifier is 0.01 to 1% by weight, based on the polyvinyl acetal.

The polyvinyl acetals obtained by the inventive process have a degree of acetalization of 1 to 80 mol %, preferably 45 -to 80 mol %. The viscosity of the polyvinyl acetals (DIN 53015; Höppler method, 10% strength solution in ethanol) is at least 2 mPas to 1200 mPas, preferably 4 to 60 mPas. The degree of polymerization is at least 100.

When compared with the processes described in the prior art, the inventive process for preparing polyvinyl acetals is not only more environmentally compatible, because there is less pollution of wastewater, but also more cost-effective, because a major portion of the raw materials, in particular of the acid, can be saved.

The inventive process for preparing polyvinyl acetals, in particular polyvinyl butyrals or mixed polyvinyl acetals, gives products which can be used in printing ink compositions.

Suitable printing ink formulations are known to the person skilled in the art and generally comprise 5 to 30% by weight pigment content, for example disazo pigments or phthalocyanine pigments, 5 to 20% by weight of polyvinyl acetal binder and solvent, for example alcohols, such as ethanol, or esters, such as ethyl acetate. Where appropriate, other additives may also be present, for example retarders, plasticizers, and other added materials, such as fillers or waxes. Adhesion promoters may also be added, where appropriate.

The polyvinyl acetals accessible using the inventive process also have very good suitability for laminated safety glass and glass composites, and high-performance safety glass, or glazing films.

Water-soluble, partially acetalized polyvinyl acetals prepared by the inventive process, in which ionic groups may also be present, for example carboxylate groups or sulfonate groups, are moreover used as a protective colloid, for example for aqueous dispersions and during polymerization in an aqueous medium, and during the preparation of water-redispersible dispersion powders. Preference is given here to water-soluble (solubility more than 10 g/l in water under standard conditions) polyvinyl acetals with a degree of acetalization of from 1 to 20 mol %, in particular from 3 to 16 mol %.

The polyvinyl acetals prepared by the inventive process may also be used in water-based coatings.

Other application sectors for the polyvinyl acetals prepared by the inventive process are use as binders in corrosion-protection compositions, as binders in the ceramics industry, specifically as binders for ceramics prior to firing, binders for ceramic powders and metal powders during injection molding (powder injection molding), and binders for the internal coating of cans.

The examples below provide further illustration of the invention, but in no way restrict the same.

Comparative Examples 1 and 11 describe the known prior-art preparation of polyvinyl acetals without use of mother liquor. Examples 2-10 and 12-20 reuse about 92% of the mother liquor from the preceding batches.

COMPARATIVE EXAMPLE 1

2617 ml of distilled water, 826 ml of 20% strength HCl, and 1355 ml of a 20% strength aqueous solution of a polyvinyl alcohol (hydrolysis number HN 20.0 mg KOH/g, viscosity 3.18 mPas (DIN 53015; Höppler method; 4% strength aqueous solution)) formed an initial charge in a 6 liter glass reactor. The initial charge was cooled to +5° C., with stirring, within a period of one hour. 100 ml of acetaldehyde, precooled to −4° C., were added within a period of 5 minutes. The internal temperature of the reactor rose here to +7° C. Within a very short time, the mixture was cooled again to +5° C. and stirred for 20 minutes at this temperature. 128 ml of butyraldehyde, precooled to −4° C., were then added within the same period of 5 minutes. The internal temperature rose here briefly to 6.5° C. 5 to 7 minutes after addition of the butyraldehyde, the initially clear batch became milky, and the product precipitated after as little as 10 minutes. After 40 minutes of reaction time at +5° C., the temperature was increased to 25° C. over a period of 3.5 hours, and maintained for a further 1.5 hours. The product was then filtered off with suction and washed with distilled water until the filtrate was neutral. The mother liquor was stored for the next batch. The product was then dried to a solids content of at least 98%, initially at 22° C., then at 35° C. in vacuo.

This gave a polyvinyl acetal with 13.6% by weight of vinyl alcohol units. The vinyl acetate content was below 2% by weight. The viscosity (DIN 53015; Höppler method; 10% strength ethanolic solution) was 19.0 mPas.

INVENTIVE EXAMPLE 2

The procedure was based on Comparative Example 1, except that use was made of 3151 ml of mother liquor obtained during the course of the work-up from Comparative Example 1. The mother liquor was added to the initial charge together with 1355 ml of the 20% strength aqueous polyvinyl alcohol solution and 292 ml of 20% strength hydrochloric acid. This gave an acid concentration of 5.20% by weight, and the conductivity of the mixture was 410 mS/cm. The amount of acetaldehyde and butyraldehyde, the precipitation, and the work-up were based on Comparative Example 1.

This gave a polyvinyl acetal with 13.3% by weight of vinyl alcohol units. The vinyl acetate content was below 2% by weight. The viscosity (DIN 53015; Höppler method; 10% strength ethanolic solution) was 19.0 mPas.

INVENTIVE EXAMPLES 3-10

The procedure was based on Example 2, except that the aqueous medium used comprised the proportion mentioned in Table 1 of mother liquor from the preceding batch. The acid concentration in the initial charge was always adjusted to 5.10-5.25% by weight.

The compositions of the batches are found in Table 1. The analysis results for each of the final products are shown in Table 2.

COMPARATIVE EXAMPLE 11

2715 ml of distilled water, 1114 ml of 20% strength HCl, and 1172 ml of a 20% strength aqueous solution of a polyvinyl alcohol (hydrolysis number HN 20.0 mg KOH/g, viscosity 3.18 mPas (DIN 53015; Höppler method; 4% strength aqueous solution)) formed an initial charge in a 6 liter glass reactor. The initial charge was cooled to −2° C., with stirring, within a period of one hour. 190 ml of butyraldehyde, precooled to −4° C., were then added within a period of 5 minutes. The internal temperature of the reactor rose here to 0 C. Within a very short time, the mixture was cooled again to −2° C. About 3 minutes after addition of the butyraldehyde, the batch, which until now had been clear, became milky, and the product precipitated after as little as 5 minutes. After 40 minutes of reaction time at −2° C., the temperature was increased to 25° C. over a period of 3.5 hours, and maintained for a further 1.5 hours. The product was then filtered off with suction and washed with distilled water until the filtrate was neutral. The mother liquor was stored for the next batch. The product was then dried to a solids content of at least 98%, initially at 22° C., then at 35° C. in vacuo.

This gave a polyvinyl butyral with 18.4% by weight of vinyl alcohol units. The vinyl acetate content was below 2% by weight. The viscosity (DIN 53015; Höppler method; 10% strength ethanolic solution) was 18.5 mPas.

INVENTIVE EXAMPLE 12

The procedure was based on Comparative Example 11, except that use was made of 3481 ml of mother liquor obtained during the course of the work-up from Comparative Example 11. The mother liquor was added to the initial charge together with 1172 ml of the 20% strength aqueous polyvinyl alcohol solution and 348 ml of 20% strength hydrochloric acid. This gave an acid concentration of 6.30% by weight, and the conductivity of the mixture was 477 mS/cm. The amount of butyraldehyde, the precipitation, and the work-up were based on Comparative Example 11.

This gave a polyvinyl acetal with 17.5% by weight of vinyl alcohol units. The vinyl acetate content was below 2% by weight. The viscosity (DIN 53015; Höppler method; 10% strength ethanolic solution) was 18.0 mPas.

INVENTIVE EXAMPLES 13-20

The procedure was based on Inventive Example 12, but the aqueous medium used in each case comprised the proportion mentioned in Table 3 of mother liquor from the preceding batch. The acid concentration in the initial charge was always adjusted to 6.20-6.31% by weight.

The compositions of the batches are found in Table 3. The analysis results for each of the final products are shown in Table 4.

Comparison of Comparative Example 1 (standard preparation method for mixed polyvinyl acetals) with Inventive Examples 2-10 shows that there is no change in the analytical or application-related product properties as a result of the (repeated) use of the mother liquor from preceding batches.

Comparison of Comparative Example 11 (standard preparation method for polyvinyl butyrals) with Inventive Examples 12 to 20 shows that there is no change in the analytical or application-related product properties as a result of (repeated) use of the mother liquor from preceding batches.

Determination Methods

1. Determination of the Dynamic Viscosity of a Solution of Polyvinyl Acetals (Solution Viscosity):

90.00±0.01 g of ethanol and 10.00±0.01 g of polyvinyl acetal were weighed out in a 250 ml Erlenmeyer flask with ground glass stopper and complete solution was achieved at 50° C. in a shaker. The mixture was then cooled to 20° C., and the dynamic viscosity (DIN 53 015; Höppler method) at 20° C. was determined using a suitable ball, e.g. ball 3.

2. Determination of Vinyl Alcohol Content:

The content of vinyl alcohol groups in the polyvinyl acetals was determined by acetylating the hydroxy groups with acetic anhydride in the presence of pyridine and 4-dimethylaminopyridine.

To this end, 1 g±0.001 g of polyvinyl acetal was dissolved in 24 ml of pyridine and 0.04 g of 4-dimethylaminopyridine at 50° C. within a period of 2 hours. The solution, cooled to 25° C., was treated with 10 ml of a mixture composed of pyridine and acetic anhydride (87/13 parts by volume) and intimately mixed for one hour. 30 ml of a mixture composed of pyridine/water (5/1 parts by volume) were then added and the mixture was shaken for a further hour. Methanolic 0.5 N KOH was then used for titration to pH 7.

Calculation

% by weight of vinyl alcohol=$[(100 \times M_w)/2000] \times$(ml blind value−ml specimen), where $M_w$=average molecular weight per repeat unit of the polymer.

3. Determination of the Viscosity of the Polyvinyl Alcohol Solutions:

The viscosity of the partially or fully hydrolyzed solid resins used as starting materials was determined by a method based on the determination of the dynamic viscosity of the polyvinyl acetals; only 4% strength aqueous solutions were used.

TABLE 1

Amount of water (mother liquor) + HCl = 3443 ml; PVAL 20% strength: 1335 ml

| | Precursor mother liquor | | | Mother liquor/HCl | | Initial charge data | |
|---|---|---|---|---|---|---|---|
| Example | Precursor | HCl conc. in % | Conductivity [mS/cm] | Mother liquor [ml] | 20% strength HCl [ml] | HCl conc. in % | Conductivity [mS/cm] |
| c1 | — | — | — | water 2617 | 826 | 5.1 | 417 |
| 2 | c1 | 3.72 | 307 | 3151 | 292 | 5.20 | 410 |
| 3 | 2 | 3.81 | 307 | 3169 | 274 | 5.25 | 401 |
| 4 | 3 | 3.82 | 307 | 3171 | 272 | 5.20 | 397 |
| 5 | 4 | 3.88 | 305 | 3182 | 261 | 5.18 | 391 |
| 6 | 5 | 3.85 | 300 | 3177 | 266 | 5.14 | 388 |
| 7 | 6 | 3.82 | 294 | 3171 | 272 | 5.15 | 387 |
| 8 | 7 | 3.82 | 294 | 3171 | 272 | 5.18 | 389 |
| 9 | 8 | 3.86 | 299 | 3178 | 265 | 5.23 | 388 |
| 10 | 9 | 3.89 | 297 | 3184 | 259 | 5.19 | 386 |
| | | 3.90 | 296 | | | | |

TABLE 2

| Example | Mother liquor GC Acetaldehyde [ppm] | Mother liquor GC Butyraldehyde [ppm] | Final product GC Acetaldehyde [ppm] | Final product GC Butyraldehyde [ppm] | Solids content of mother liquor [%] |
|---|---|---|---|---|---|
| c1 | 1800 | 8980 | 9.5 | 575 | — |
| 2 | 3600 | 10300 | 13 | 515 | 0.01 |
| 3 | 4380 | 11300 | 20 | 520 | 0.30 |
| 4 | 4720 | 11100 | 25 | 1020 | 0.28 |
| 5 | 5550 | 11900 | 13 | 790 | 0.25 |
| 6 | 5500 | 11900 | 20 | 1300 | 0.26 |
| 7 | 5600 | 12100 | 33 | 2150 | 0.33 |
| 8 | 6050 | 11800 | 27 | 1200 | 0.42 |
| 9 | 5650 | 11800 | 41 | 1550 | 0.33 |
| 10 | 5380 | 13000 | 22 | 1200 | 0.25 |
|  |  |  |  |  | 0.37 |

| Example | Appearance | Moisture [%] | pH | Conductivity [µS/cm] | OH number [%] | Viscosity [mpas] | EtAc solubility |
|---|---|---|---|---|---|---|---|
| c1 | white | 0.6 | 5.2 | 15.0 | 13.6 | 19.0 | clear |
| 2 | white | 0.8 | 5.1 | 15.0 | 13.3 | 19.0 | clear |
| 3 | white | 1.0 | 4.8 | 18.3 | 13.5 | 19.8 | clear |
| 4 | white | 0.8 | 4.8 | 10.9 | 13.4 | 19.4 | clear |
| 5 | white | 0.8 | 4.6 | 21.4 | 13.2 | 19.2 | clear |
| 6 | white | 0.6 | 4.4 | 26.1 | 13.2 | 19.3 | clear |
| 7 | white | 1.2 | 4.4 | 28.3 | 13.3 | 18.9 | clear |
| 8 | white | 1.0 | 4.4 | 22.6 | 13.1 | 19.0 | clear |
| 9 | white | 1.3 | 4.4 | 24.9 | 13.1 | 19.7 | clear |
| 10 | white | 1.3 | 4.3 | 23.3 | 13.2 | 19.4 | clear |

TABLE 3

Amount of water (or mother liquor) + HCl = 3829 ml;
PVAL 20% strength: 1172 ml

| Example | Mother liquor precursor Precursor | Mother liquor precursor HCl conc. % | Mother liquor precursor Conductivity [mS/cm] | Mother liquor/HCl 20% Mother liquor | Mother liquor/HCl 20% strength HCl | Initial charge data HCl conc. % | Initial charge data Conductivity [mS/cm] |
|---|---|---|---|---|---|---|---|
| c11 | — | — | — | water 2715 | 1114 | 6.20 | 482 |
| 12 | c11 | 4.82 | 386 | 3481 | 348 | 6.30 | 477 |
| 13 | 12 | 4.96 | 388 | 3513 | 316 | 6.25 | 472 |
| 14 | 13 | 4.91 | 388 | 3502 | 327 | 6.20 | 470 |
| 15 | 14 | 4.92 | 387 | 3504 | 325 | 6.25 | 469 |
| 16 | 15 | 4.90 | 382 | 3499 | 330 | 6.30 | 470 |
| 17 | 16 | 4.93 | 381 | 3506 | 323 | 6.31 | 468 |
| 18 | 17 | 4.92 | 380 | 3504 | 325 | 6.30 | 469 |
| 19 | 18 | 4.96 | 386 | 3513 | 316 | 6.30 | 467 |
| 20 | 19 | 4.97 | 380 | 3516 | 313 | 6.21 | 462 |
|  |  | 4.99 | 380 |  |  |  |  |

TABLE 4

| Example | Mother liquor GC Butyraldehyde [ppm] | Product GC Butyraldehyde [ppm] | Solids content of mother liquor [%] |
|---|---|---|---|
| c11 | 3370 | 230 | — |
| 12 | 4250 | 240 | 0.02 |
| 13 | 5120 | 320 | 0.20 |

TABLE 4-continued

| | | | |
|---|---|---|---|
| 14 | 4420 | 380 | 0.14 |
| 15 | 5050 | 415 | 0.22 |
| 16 | 5100 | 365 | 0.20 |
| 17 | 5150 | 380 | 0.26 |
| 18 | 4700 | 500 | 0.32 |
| 19 | 4760 | 410 | 0.29 |
| 20 | 5020 | 300 | 0.35 |
| | | | 0.33 |

Analyses of final products

| Example | Appearance | Moisture [%] | pH | Conductivity [µS/cm] | OH number [%] | 10% strength EtOH viscosity [mPas] | EtAc solubility |
|---|---|---|---|---|---|---|---|
| c11 | white | 0.7 | 5.0 | 10.8 | 18.4 | 18.5 | clear |
| 12 | white | 0.9 | 4.8 | 13.4 | 17.5 | 18.0 | clear |
| 13 | white | 0.6 | 4.5 | 18.6 | 16.8 | 18.5 | clear |
| 14 | white | 0.8 | 4.6 | 12.1 | 16.9 | 18.1 | clear |
| 15 | white | 0.7 | 4.5 | 16.1 | 17.1 | 18.0 | clear |
| 16 | white | 0.9 | 4.6 | 15.2 | 16.3 | 18.0 | clear |
| 17 | white | 0.9 | 4.6 | 18.0 | 16.4 | 17.9 | clear |
| 18 | white | 0.8 | 4.4 | 18.5 | 16.4 | 18.0 | clear |
| 19 | white | 1.0 | 4.2 | 24.3 | 16.4 | 18.0 | clear |
| 20 | white | 1.0 | 4.3 | 23.9 | 16.5 | 18.0 | clear |

What is claimed is:

1. A process for preparing polyvinyl acetals by hydrolysis of a vinyl ester polymer and acetalization of the resultant polyvinyl alcohol with one or more aldehydes selected from the group consisting of aliphatic and aromatic aldehydes having 1 to 15 carbon atoms, comprising:
   a) providing a polyvinyl alcohol to form an initial charge in an aqueous medium,
   b) if necessary, adding acid to adjust to a pH of <1,
   c) initiating acetalization by addition of an aldehyde component, and
   d) precipitating polyvinyl acetal and separating polyvinyl acetal via filtration from a filtrate,
   wherein from 10 to 100% by weight of the aqueous medium of a) comprises the filtrate from a preceding batch of polyvinyl acetal production, and, optionally reusing the filtrate produced in d) in a further polyvinyl acetal production batch.

2. The process of claim 1, wherein the filtrate produced in step d) is reused in a further production of polyvinyl acetal.

3. The process of claim 1, wherein the vinyl ester polymer contains one or more monomer units selected from the group consisting of vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having 5 to 11 carbon atoms.

4. The process of claim 2, wherein the vinyl ester polymer contains one or more monomer units selected from the group consisting of vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having 5 to 11 carbon atoms.

5. The process of claim 1, wherein the vinyl ester polymer used comprises polyvinyl acetate, a vinyl acetate-1-methylvinyl acetate copolymer, or a vinyl acetate (meth)acrylic acid copolymer.

6. The process of claim 2, wherein the vinyl ester polymer used comprises polyvinyl acetate, a vinyl acetate-1-methylvinyl acetate copolymer, or a vinyl acetate (meth)acrylic acid copolymer.

7. The process of claim 1, wherein the polyvinyl alcohol has a degree of hydrolysis of 50 to 100 mol %.

8. The process of claim 1, wherein the aldehyde(s) comprise one or more selected from the group consisting of formaldehyde, acetaldehyde, propionaldehyde, butyraldehyde, and benzaldehyde.

9. The process of claim 1, wherein the polyvinyl alcohol forms an initial charge in the form of an aqueous solution with a concentration of 10 to 50% by weight solids, and the solids content is altered by addition of the filtrate from a preceding polyvinylacetal acetalization.

10. The process of claim 1, wherein polyvinyl acetals are obtained with a degree of acetalization of 45 to 80 mol % and with a degree of polymerization of at least 100.

* * * * *